United States Patent [19]

Meerkatz et al.

[11] Patent Number: 4,890,441
[45] Date of Patent: Jan. 2, 1990

[54] METHOD AND APPARATUS FOR PACKAGING FLUENT SOLID MATERIAL, IN PARTICULAR COFFEE

[75] Inventors: Joachim Meerkatz, Berlin; Gerhard Clausing, Sottrum, both of Fed. Rep. of Germany

[73] Assignee: Jacobs Suchard GmbH, Bremen, Fed. Rep. of Germany

[21] Appl. No.: 133,297

[22] Filed: Dec. 15, 1987

[30] Foreign Application Priority Data

Dec. 30, 1986 [DE] Fed. Rep. of Germany ....... 3644713

[51] Int. Cl.⁴ ................................................ B65B 1/46
[52] U.S. Cl. .......................................... 53/456; 53/53; 53/77; 53/502; 177/50; 177/165
[58] Field of Search ................... 53/502, 53, 54, 52, 53/77, 558, 570, 459, 452, 456; 177/165, 50, 25.14

[56] References Cited

U.S. PATENT DOCUMENTS

| | | | |
|---|---|---|---|
| 3,073,398 | 1/1963 | Blodgett et al. | 177/165 X |
| 3,684,875 | 8/1972 | Smith et al. | 177/165 X |
| 4,049,068 | 9/1977 | Kavanagh et al. | 177/165 X |
| 4,582,150 | 4/1986 | Taylor et al. | 177/165 X |
| 4,676,329 | 6/1987 | Reichmuth et al. | 177/165 |

FOREIGN PATENT DOCUMENTS 2532105  2/1976  Fed. Rep. of Germany .

*Primary Examiner*—James F. Coan
*Attorney, Agent, or Firm*—Burns, Doane, Swecker & Mathis

[57] ABSTRACT

A method of packaging fluent solid materials such as coffee includes determining the gross weight of filled packets and determining the tare allowance of the packets. The tare allowance is determined through random sampling and that value is subtracted from the gross weight of the filled packets in order to define a nominal value. That nominal value is then fed to the filling machine in a closed control loop. The apparatus for packaging fluent solid materials includes a bag forming machine, a filling machine for filling the bags, a gross balance for filling the bags and a conveyor for conveying the bags. A switch is provided for filtering out empty bags from the conveyor to a tare balance and a control unit is connected to the measuring outputs of the tare balance. The regulating output of the control unit permits bags to be filtered out and weighted at a defined frequency.

28 Claims, 3 Drawing Sheets

METHOD AND APPARATUS FOR PACKAGING FLUENT SOLID MATERIAL, IN PARTICULAR COFFEE

BACKGROUND OF THE INVENTION

The present invention relates to a method and apparatus for packaging fluent solid material. In particular the present invention concerns a method and apparatus for packaging coffee.

DESCRIPTION OF RELATED ART

In introducing coffee into packages one problem that arises concerns fluctuations that occur in the filling machine, with respect to the bulk weight of the coffee and the tare weight. Exact adherence to the average value of the packet contents is required by law, with excess weight in the packet contents being allowable and underweight packets being unacceptable. The admissible deviation values are likewise set forth by law.

On average, more coffee than necessary is placed in the packets so that the minimum value can be met.

As far as the fluctuations are concerned, which are caused by the filling machines or by fluctuations in the bulk weight of the coffee, extensive measures for minimising the fluctuations have already been taken here.

In the area of tare weight, that is, the weight of the bags to be filled, certain fluctuations cannot be avoided, since the foils from which the bags are produced, with regard to their thickness, are only constant within certain limits on account of the production processes (blowing). Since the blankets for each bag are the same size, fluctuations result in the tare weight, which at present are at about 8%.

Of course, the same difficulty occurs in all other fluent solid materials, wherein the more expensive the packing contents, the more serious the problem.

Continuously determining the tare weight and controlling the filling quantity by comparison with a continuously determined gross weight, as is known, for example, in the filling of bottles or glasses, has to be ruled out in the filling of bags, since the bags are exceptionally fragile and since the high throughput rates during the filling installations do not permit the bags to be weighed out with conventional balances. A main problem in this respect lies in the considerable reverberation time of the balances when considered with respect to such small weights.

Hitherto, the customary procedure has been that, at the manufacture's plant, a number of bags are taken manually at the start of a shift from the current production and manually weighed out. The average packing weight thus established is taken as a basis for setting the filling machine. However, this procedure should be rejected not only on account of the labor involved but also on account of the unsatisfactory results with regard to accuracy.

SUMMARY OF THE INVENTION

Starting from the above state of the art, the object of the present invention is to further develop a method and an apparatus of the type mentioned at the beginning to the effect that a more exact net weighed-in quantity than was previously possible can be achieved with little expenditure.

Owing to the fact that random samples are taken repeatedly and not only at the start of a shift, success is achieved, in the event of discrete fluctuations during operation, in eradicating errors which hitherto had to be tolerated. Discrete fluctuations of this type occur, for example, when, with a foil roll, a joint occurs which leads over from one foil strip to the next foil strip Surprisingly, it was possible to show that a measurement of the tare allowance carried out by continuous random sampling can be used for setting the nominal value in a closed control loop. In this respect, it is of advantage if a sliding average value is formed over a defined number of empty packets.

The control reacts especially quickly if the sliding average value is formed in two group sizes, a larger and a smaller group, and the average value of the smaller group is then taken as a basis for the control if it deviates from the average value of the larger group by at least or by more than a predetermined amount. Consequently, on the one hand, the control behaviour in general does not become unnecessarily unsteady (if, that is, the average of the smaller group lies within the admissible fluctuation range); on the other hand, discrete changes can nevertheless be smoothed out.

In the apparatus according to the present invention, the bags to be weighed out are preferably fed to an electronic balance via a blast apparatus.

BRIEF DESCRIPTION OF THE DRAWINGS

Further preferred embodiments of the present invention follow from the following exemplary embodiments of preferred embodiments of the present invention which are described in greater detail with reference to diagrams. In this respect.

DETAILED DESCRIPTION OF THE PREFERRED EMBODIMENTS

Figure 1:
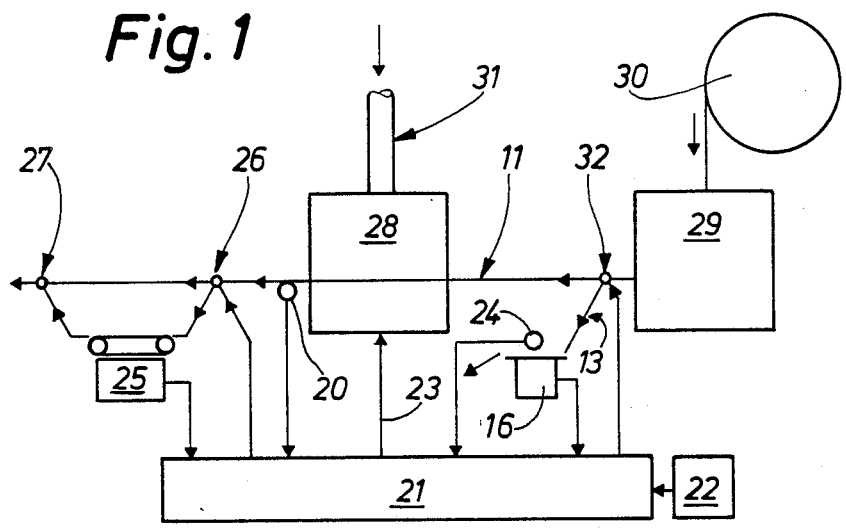
FIG. 1 is a schematic diagram of the entire filling installation according to the present invention.

A preferred embodiment of a filling installation is shown in FIG. 1. A machine for producing bags is designated by the reference 29, to which machine the foil material is fed from a foil roll 30. The bags, which are ready-folded and open at the top, are conveyed on a conveyor belt 11 which feeds the bags to a filling machine 28. Coffee which is to be filled into the bags is fed to the filling machine 28 via a coffee feed line 31. The conveyor belt 11 leaves the filling machine 28 with the ready filled and sealed packets.

Provided between the bag forming machine 29 and filling machine 28 is a bag switch 32, the design of which is described in greater detail below. The switch 32 is actuated at certain instants by a control unit 21, and in such a way that individual bags are filtered out from the conveyor belt 11 and fed to a tare balance 16 via a conveying tube 13.

The tare balance 16 converts the weight of the bag into an electrical output signal which is fed in turn to the control unit 21. After weighing, the weighed bag is pushed away from the tare balance 16 via an apparatus which can be controlled by the control unit 21 and is described in greater detail below. Moreover, provided above the tare balance 16 is a light barrier 24 through which it is possible to determine whether a bag is lying on the tare balance 16 and whether the bag is lying correctly. The output signal of the light barrier 24 is likewise fed to the control unit 21.

Moreover, the filling installation is provided with a belt sensor 20 through which the cycle rate at which the installation is working can be established. This belt sensor 20 is used for synchronizing during the filtering-out operation.

After the filling machine 28, a branching switch 26, likewise controlled by the control unit 21, is provided for filtering out filled packets. These packets are passed over an electronic gross balance 25 and fed back to the conveying flow via a filter-in switch 27. In the gross balance 25, the weight of the weighed packets is converted into electrical signals which are again fed to the control unit 21.

Moreover, an input unit 22 via which preset values can be fed in, is connected to the input of the control unit 21.

A regulating output 23 is connected to a regulating member of the filling machine 28, it being possible for the coffee quantity filled by the filling machine 28 to be adjusted via the regulating signal of the regulating output 23.

Figure 2:
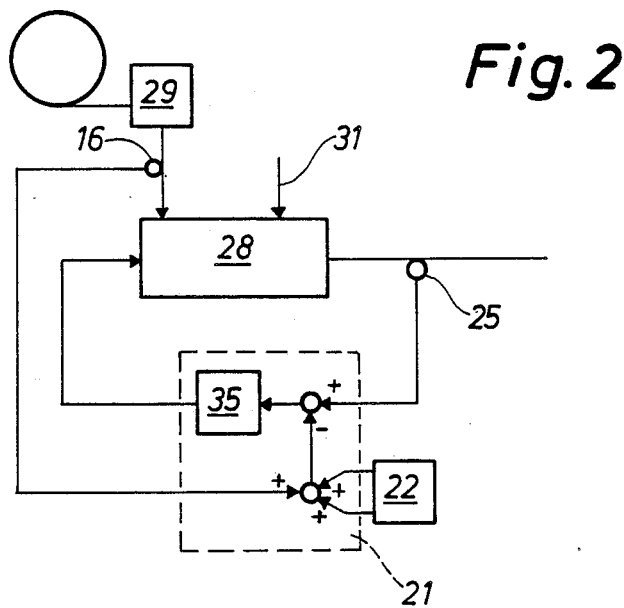
FIG. 2 is a schematic diagram of the control loop.

The control interrelationship is described in greater detail below with reference to FIG. 2.

The gross weight of the filled and sealed packets is weighed and fed to a comparator via the sensor 25 (gross balance). Also fed to the comparator is a nominal value which is formed from the actual nominal value, namely the packet contents, a constant tare allowance (adhesive weight, label weight, etc.) and the output signal of the measuring sensor 16 (tare balance). The first two values are fed in via the input unit 22.

The measuring sensor (16) (tare valance) sits at the output of the bag forming machine 29, which feeds the bags to the filling machine 28.

The difference between the measured gross weight and the nominal gross weight is fed to a computer 35, which is an integral part of the control unit 21 and produces an output signal which is used to set the filling quantity in the filling machine 28. In this way, a closed control loop is thus formed which permits a constant filling quantity (filling weight) irrespective of fluctuations in the tare weight.

Described below is a preferred embodiment of that part of the apparatus which is used for filtering out and weighing the empty packets. In this connection, an important problem is the fragility and the low weight of the packets 10.

The packets 10 arriving on the conveyor belt 11 are held in conveyor belts 12. The conveyor cells 12 are provided underneath with an opening, with the mouth of a blow-out line 18 being attached beneath the conveyor belt 11 in such a way that the openings in the conveyor cells 12 pass this mouth when the conveyor belt 11 is running.

The blow-out line 18 is connected to a compressedair source (not shown) via a solenoid valve 19. The solenoid valve 19 is controlled via an output of the control unit 21.

Positioned above the conveyor belt 11 or the conveyor cells 12 is the mouth of a conveying tube 13 whose cross section is essentially adapted to that of the bags 10 to be conveyed. The arrangement is made in such a way that, when a conveyor cell 12 is correctly positioned, with bag 10 located therein, above the mouth of the blow-out line 18, bags 10 can be blown into the conveying tube 13. In this respect, the directed air flow is of such proportions that a bag blown into the line 13 is conveyed through the line.

In its end section 34, the line 13 runs essentially horizontally and is open at the bottom. In the axis of the end section 34, a baffle plate 14 is attached so that packets 10, which pass into the end section 34 at a certain conveying speed, are slowed down on the baffle plate 14 and fall downwards.

Beneath the end section 34 of the tube line 13, a tare balance 16 is attached in such a way that bags 10 falling down fall onto the weighing plate 33 of the balance 16. The balance 16 is preferably designed as an electronic balance which constantly and automatically balances itself in the unloaded state. Its output is taken to an input of the control unit 21.

A slide 15 which can be actuated via an output signal of the control unit 21 is associated with the balance 16. In this respect, the slide 15 is arranged in such a way that a packet 10 located on the weighing plate 33 of the balance 16 is pushed from the plate 33 when the slide 15 is actuated. Moreover, associated with the balance 16 is an exit shute 17 onto which a bag 10 pushed from the plate 33 by the slide 15 can fall in order to then be fed to a scrap container.

As an alternative to the slide 15, the packets 10 can be discharged from the plate 33 and conveyed to the scrap container by an air blast from a blast nozzle (not shown).

Figure 4:
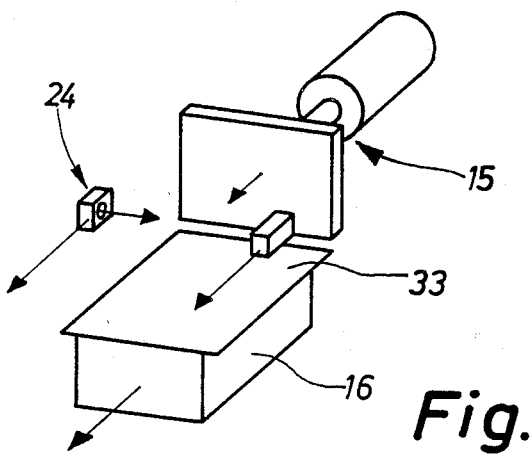
FIG. 4 is a perspective view of the tare balance with a slide.

Moreover, attached above the weighing plate 33 is a light barrier 24 which is described in greater detail below and which is connected to an input of the control unit 21. In this respect, the light barrier (see FIG. 4) is attached in such a way that the light path of the light barrier 24 is interrupted when a bag 10 lies on the weighing plate 33, so that the presence of a bag 10 on the weighing plate 33 can be detected.

A light barrier (not shown) is also preferably attached in the end section 34 of the conveying tube 13. That light barrier is connected to the control unit 21 so that the jamming of bags in the end section 34 can be detected.

Provided near the conveyor belt 11 is a belt sensor 20, the output signals of which are fed to the control unit 21 in order to synchronize the control of the solenoid valve 19 with the cycle rate of the conveyor belt 11.

Figure 3:
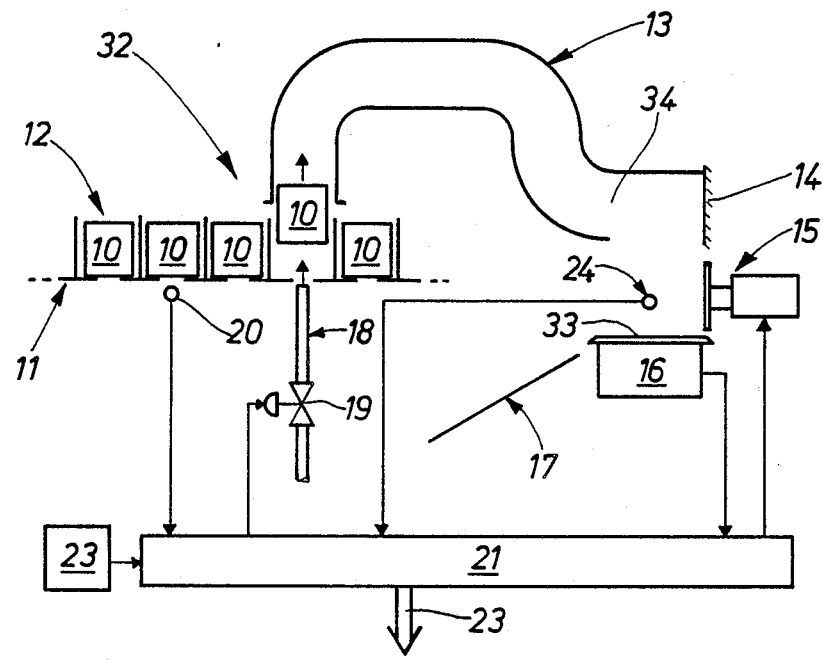
FIG. 3 is a schematic diagram of the filteringout apparatus.

The input unit 23, which is connected to the input of the control unit 21, and the regulating output 23 of the control unit 21 are indicated in FIG. 3 for the sake of completeness.

The procedure according to the invention which can be carried out with the apparatus described above is described in greater detail below with reference to FIG. 5. In this diagram, the number of bags or, at constant conveying speed of the belt 11, the time is plotted to the right.

Figure 5:
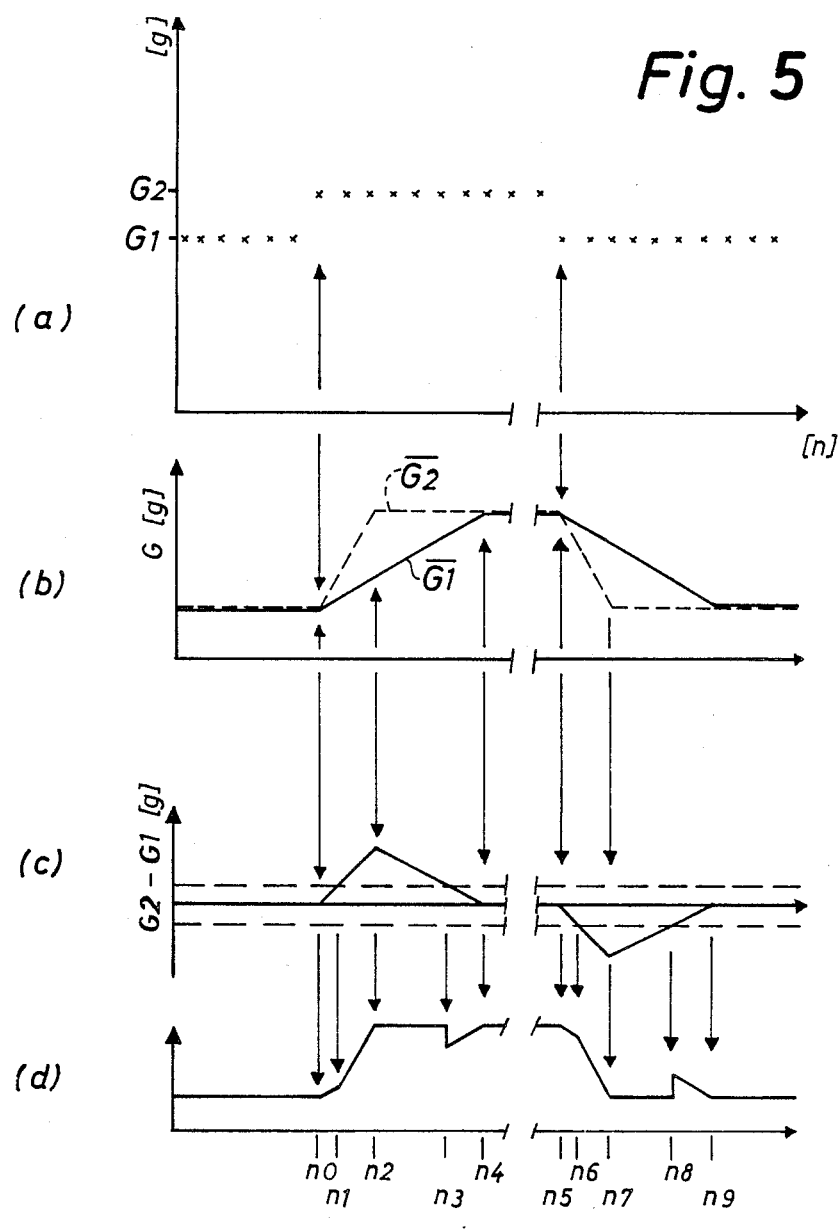
FIG. 5 is a graph for representing the control behavior of the filling installation.

In FIG. 5 (a) the tare weight, that is, the weight of the empty bags, is plotted at the top, with a discrete change in the tare weight from weight G1 to weight G2 and back again to weight G1 being shown to illustrate the control behaviour.

If two sliding average values $\overline{G1}$ and $\overline{G2}$ are now formed, with one average value $\overline{G1}$ (in the example shown) being formed from eight bags and the second average value $\overline{G2}$ being formed from three bags, an average progression results as shown in FIG. 5 (b), in which case a linear interpolation has been made in the diagram between the values, which are actually stepped. It is therefore apparent from FIG. 5 (b) that a discrete change in the tare weight results in a ramp-shaped slow change in the average value $\overline{G1}$ and a similarly rampshaped quicker change in the average value $\overline{G2}$. This applies to both the rise and the fall of the curves.

With the apparatus according to the present invention, not only are these average values formed but also the difference between the two average values $\overline{G1}$ and $\overline{G2}$. The result of this differential formation is shown in FIG. 5 (c). Moreover, the difference is compared with a threshold value illustrated as a broken line in FIG. (c). According to the present invention, the average value $\overline{G1}$, which has been obtained over the larger number of samples, is now, in the normal case, as a tare value, taken as a basis for the control (see FIG. 2). But if the difference between the two average values exceeds the predetermined threshold value, as is shown at the instant n1, the average value $\overline{G2}$, as a tare value, is taken as a basis for the control. These facts are shown more precisely in FIG. 5. (d). The resulting curve, which represents the tare weight taken as a basis for the control, when there is a discrete change in the actual measured values, therefore rises first of all in accordance with the slope of the average value curve $\overline{G1}$ (between n0 and n1). But as soon as the difference between the two average values $\overline{G1}$ and $\overline{G2}$ exceeds the threshold, the tare allowance changes rapidly in accordance with the steeper rise of the average value curve $\overline{G2}$ (between n1 and n2) so that the tare value which is taken as a basis for the control is approximated very quickly to the actual value. When the tare value falls back from weight $\overline{G2}$ to weight $\overline{G1}$, the operation runs inversely.

In the very simple embodiments of the invention shown here, fluctuations in the control behaviour result from the jumping to and fro between the two average values $\overline{G1}$ and $\overline{G2}$, which fluctuations can be seen in FIG. 5 (d) between the instants n3 and n4, and n8 and n9 respectively. Fluctuations of this type in another preferred embodiments of the invention, can be compensated by the jumping from the average value $\overline{G1}$ to the average value $\overline{G2}$ taking place abruptly but by the jumping back from the average value $\overline{G2}$ to the average value $\overline{G1}$ (in the calculation of the tare allowance) taking place with retardation.

Surprisingly, it has turned out that excellent levelling of fluctuations in the tare weight on account of fluctuations in the foil thickness can be achieved with the method according to the invention. In this respect, it is sufficient to carry out a gross weight measurement of 10%, whereas the tare weight is determined for only 0.75% of the empty bags. Owing to the fact that the empty bags are rejected, the cycle rate of the apparatus can be substantially increased, for it is not necessary to filter the fragile empty bags back into the process. However, since only 0.75% of the empty bags are rejected, the loss is kept within perfectly acceptable limits.

The correction value determined in the control unit 21 (or by the computer 35) for the adjustment of the filling machine is preferably fed to this filling machine via a motor-operated potentiometer. The motoroperated potentiometer is preferably used instead of the potentiometer which is already manually adjustable, with switch-over means being provided so that the installation can be switched over to manual setting if necessary.

Moreover, all individual measurements of tare and gross weight are compared with the instantaneous average value and then rejected if appropriate. That is, they are not taken as a basis for the further formation of the average value, if they deviate by more than a predetermined amount from the instantaneous average value. Consequently, "outliers" do not lead to an undesired control operation.

Moreover, the result of all tare and gross measurements is preferably stored and documented. This documentation can then be used for inspection purposes by the user or also by the state supervisory bodies. This is a further, truly important advantage of the present invention, which advantage has not existed hitherto.

If the weigh-in accuracy achievable with the apparatus according to the present invention or with the method according to the invention is compared with the weigh-in accuracy possible hitherto, the advantages of the present invention become quite obvious: until now it has been necessary on average, instead of the required 500 g of weighed-in quantity, to fill 501 g so that the admissible average values and deviation values are reliably maintained. Since the tare weight is 19 g and the fluctuations (as stated above) are at about 8%, that is, at 1.5 g per packet, a weighed-in quantity of about 500.1 to 500.2 g can be reached when using the present invention. The expenditure required for this is exceptionally low with respect to both the method and apparatus.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations, changes and equivalents may be made by others without departing from the spirt of the present invention. Accordingly, it is expressly intended that all such variations, changes and equivalents which fall within the spirit and scope of the present invention as defined in the claims, be embraced thereby.

We claim:

1. A method of packaging fluent solid material, particularly coffee, in packets through use of a filling machine in order to produce filled packets, wherein the filing quantity of the filling machine is set according to the gross weight of the filled packets and a tare allowance, the method comprising the steps of:
   determining a tare weight by taking an average of several random samples of empty packets and using the averaged random samples as a basis for a control;
   determining the gross weight of filled packets;
   inputting into the filling machine as a nominal value in a closed control loop the difference between the value of the gross weight determined and the value of the tare weight determined; and
   filling the empty packets with the fluent solid material based on the inputted nominal value.

2. The method according to claim 1, wherein the step of determining the tare weight includes the step of weighing out empty packets by random sampling.

3. The method according to claim 1, wherein the random sampling is carried out at regular intervals.

4. The method according to claim 1, wherein the average of several random samples is determined as a sliding average value over a defined number of empty packets.

5. The method according to claim 4, wherein the value of an individual random sample that deviates from an instantaneous average value by more than a predetermined maximum amount is rejected and is not used in further average value formulations.

6. The method according to claim 5, wherein the sliding average value is formed in a larger group size and a smaller group size, the average value of the smaller group being taken as a basis for the control when and only when the average value of the smaller group deviates from the average value of the larger group by at least a predetermined amount.

7. The method according to claim 6, wherein the gross weight is determined by random sampling.

8. The method according to claim 7, wherein the gross weight random samples are taken more frequently than the tare weight random samples.

9. The method according to claim 8, wherein the weighed empty packets are rejected.

10. The method according to claim 4, wherein the sliding average value is formed in a larger group size and a smaller group size, the average value of the smaller group being taken as a basis for the control when and only when the average value of the smaller group deviates from the average value of the larger group by at least a predetermined amount.

11. The method according to claim 1, wherein the gross weight is determined by random sampling.

12. The method according to claim 1, wherein the step of determining the tare weight includes the step of weighing out empty packets by random sampling and thereafter, rejecting the weighed empty packets.

13. An apparatus for packaging fluent solid material, particularly coffee, comprising:
a bag forming machine for producing bags to be filled with said material;
a filling machine for filling the bags with said material;
a gross weight balance for weighing the bags after they are filled;
a conveyor for conveying the bags;
means for filtering out empty bags from the conveyor;
a tare balance for weighing empty bags;
conveying means for conveying the filtered-out bags to the tare balance; and
a control unit having an input side and an output side, the input side being connected to the tare balance and the gross weight balance for receiving measuring outputs therefrom, and the output side being connected to the filling machine and the means for filtering out empty bags from the conveyor, whereby empty bags are filtered out from the conveyor and weighed at a predetermined frequency while the filling machine is regulated so that the filling quantity from the filling machine is set according to the value of the gross weight determined less the value of the tare weight determined.

14. The apparatus according to claim 13, wherein the means for filtering out empty bags comprises a blast apparatus having a controllable valve.

15. The apparatus according to claim 14, wherein the conveyor has openings therein that are positioned in such a way with respect to the blast apparatus that bags positioned on the conveyor can be blown upward, off the conveyor, by the blast apparatus.

16. The apparatus according to claim 15, wherein conveying means terminates at a predetermined distance above the tare balance so that the filtered-out bags all onto a weighing plate that forms a portion of the tare balance.

17. The apparatus according to claim 16, wherein a discharge device that is actuable in response to a signal from the control unit is attached above the weighing plate so that bags positioned on the weighing plate can be fed to an exit chute.

18. The apparatus according to claim 17, further comprising a detector apparatus connected to the input side of the control unit and positioned above the weighing plate for detecting the presence of a bag on the weighing plate.

19. The apparatus according to claim 18, wherein said conveying means is an elongated tubular member.

20. The apparatus according to claim 49, wherein an end section of said tubular member extends substantially horizontally and a baffle plate is positioned above the weighing plate and substantially perpendicular with respect to the end section of the tubular member so that conveyed bags traveling through the tubular member contact the baffle plate and fall down onto the weighing plate.

21. The apparatus according to claim 20, further comprising a blast apparatus for discharging empty bags from the tare balance after they have been weighed.

22. The apparatus according to claim 21 wherein the input side of the control unit is connected to an input unit through which the tare allowance can be inputted.

23. The apparatus according to claim 22, wherein said control unit is a computer.

24. The apparatus according to claim 13, wherein the conveying means terminates at a predetermined distance above the tare balance so that the filtered-out bags fall onto a weighing plate that forms a part of the tare balance.

25. The apparatus according to claim 13, further comprising a detector apparatus connected to an input side of the control unit and positioned above a weighing plate that forms a part of the tare balance for detecting the presence of a bag on the weighing plate.

26. The apparatus according to claim 13, wherein said conveying means is an elongated tubular member.

27. The apparatus according to claim 13, further including an input unit connected to an input side of the control unit for inputting the tare allowance into the control unit.

28. The apparatus according to claim 13, wherein said control unit is a computer.

* * * * *

UNITED STATES PATENT AND TRADEMARK OFFICE
CERTIFICATE OF CORRECTION

PATENT NO. : 4,890,441

DATED : January 2, 1990

INVENTOR(S) : Joachim MEERKATZ et al

It is certified that error appears in the above-identified patent and that said Letters Patent is hereby corrected as shown below:

In claim 16, line 4, amend "all" to --fall--.

In claim 20, line 1, amend "49" to --19--.

Signed and Sealed this

Fourteenth Day of May, 1991

Attest:

HARRY F. MANBECK, JR.

*Attesting Officer*     *Commissioner of Patents and Trademarks*